Patented Apr. 24, 1951

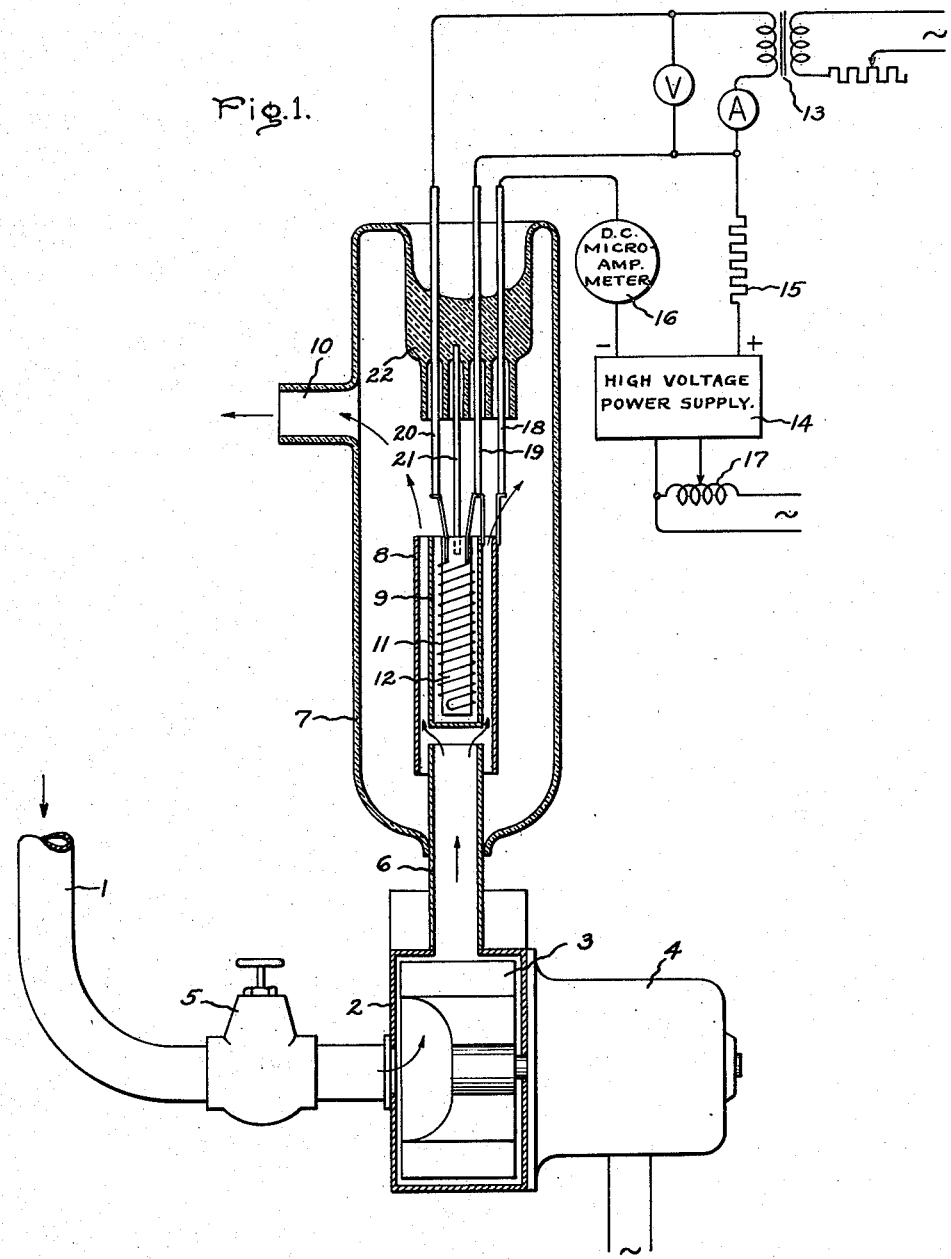

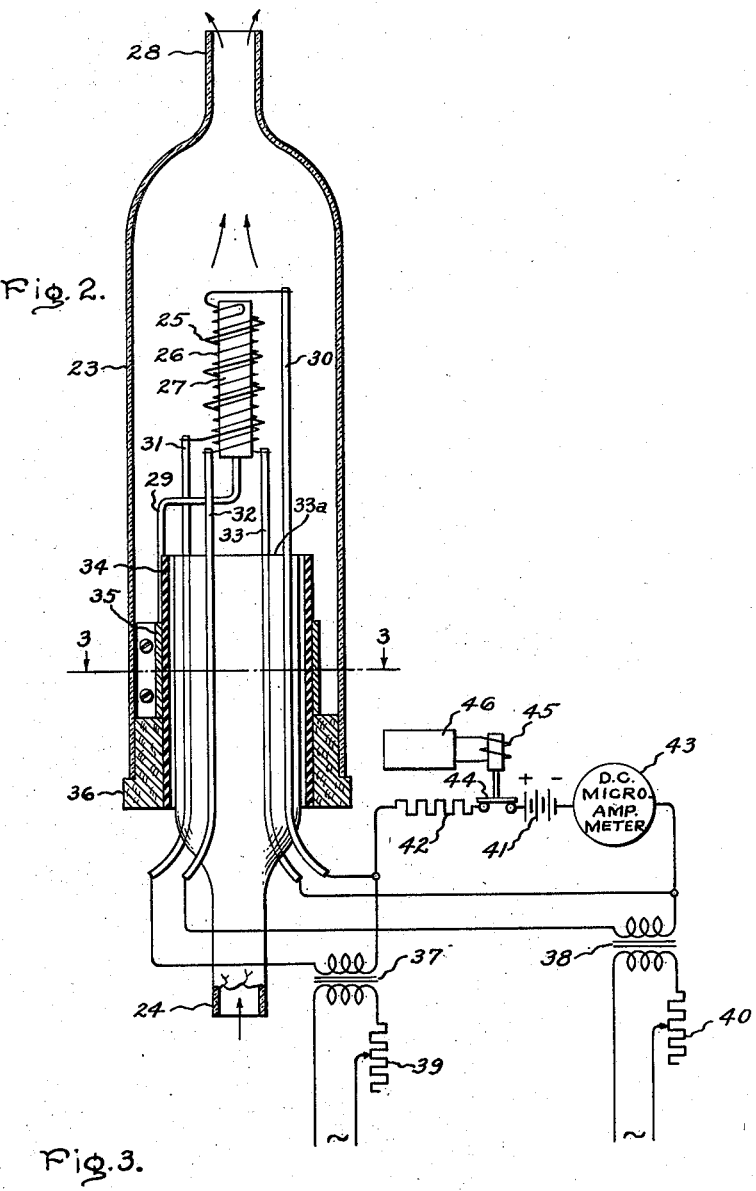

2,550,498

UNITED STATES PATENT OFFICE 2,550,498

METHOD AND APPARATUS FOR ELECTRICALLY DETECTING VAPORS AND THE LIKE

Chester W. Rice, Schenectady, N. Y., assignor to General Electric Company, a corporation of New York Application June 14, 1947, Serial No. 754,657

54 Claims. (Cl. 175—183)

This invention relates to electrical methods and apparatus for detecting the presence of finely divided forms of certain substances such as certain gases, vapors, smokes or other particles of matter, in the atmosphere or elsewhere, and has for its object the provision of an improved method and apparatus which is simple and economical in construction and operation, which is capable of being maintained in a continuous state of operation, and which is at the same time capable of detecting the presence of very small concentrations of the substances.

As it well known in the art, it is frequently desirable in connection with numerous industrial and non-industrial practices to be able to detect the presence of substances under the aforementioned conditions in order that measures may be taken to control or eliminate the concentration thereof for such purposes as the minimizing of personnel health hazards where they are toxic, the preservation of the source from which the substance emanates, or the detection and locating of leaks in vacuum and pressure systems. It will be understood that among the desiderata of any method or apparatus for the detection of the substances under these circumstances will be simplicity and economy of construction and operation, the ability to detect extremely small concentrations of the substance and the ability to give a rapid and continuous indication of the concentration thereof at all times. Prior art detection methods and apparatus have not been as satisfactory as could be desired in these respects principally because they involved cumbersome time consuming methods and apparatus, or because of the costly and complex nature of the apparatus involved. Accordingly, it is the primary object of this invention to provide an improved method and apparatus which is measurably better than the prior art in these respects.

The features of the invention desired to be protected are pointed out in the appended claims. The invention itself together with its further objects and advantages will be best understood by reference to the following specification taken in connection with the appended drawings. Fig. 1 represents one embodiment of what may be called the "direct action" method of operating the invention in a convenient industrially or otherwise useful vapor detector designed to detect the presence of finally divided substances and vapors in any suitable inert atmosphere acting as a carrier of the substance. Figs. 2 and 3 illustrate one embodiment of the "indirect action" method of operating the invention, the Fig. 3 being a cross section of Fig. 2 along the line 3—3.

Briefly stated, the objects of the invention are attained by introducing a sample of an atmosphere, which may be suspected of containing a concentration of a finely divided substance to be detected, into an electrical discharge device under hereinafter described conditions which permit the substance to induce positive ion formation at a positively charged heated electrode, the positive ions so formed being collected by a negatively charged electrode to produce an indicating current which increases with the concentration of the substance. For certain substances, such as the alkali metals and their compounds, such ion formation apparently occurs by ionization of the substance itself when it comes into contact with the heated electrode. For others, such as the halogens and others hereinafter enumerated, the substance appears to cause ion formation only in the presence of what I shall call sensitizing materials, such as the alkali metals or their compounds, and it appears in this case that the sensitizing materials themselves are actually ionized to afford the desired positive ion current.

In the "direct action" method of operation, the functions of positive ion formation and sensitization are both performed at the positively charged electrode. In the "indirect action" method the chemical action which characterizes the sensitization function is performed independently at a controllably heated sensitization element of the discharge device apart from the positively charged electrode, the positive ion formation function then being performed at the positively charged electrode which because of its separation from the latter element may be controllably heated independently thereof.

It is found that when even a minute quantity of the substance is introduced to the discharge device in the foregoing manner, an increase of electric current of detectable magnitude can be caused to flow between the electrodes. By using a suitable detector circuit it is possible to provide a continuous indication of not only the presence of the substance but also the quantity or concentration thereof.

While gas detectors supposedly operative on the principle of changes in the current which flows between charged electrodes between which a gaseous mixture is passed have heretofore been proposed in U. S. Letters Patent 1,421,720— C. H. M. Roberts, the method there proposed is fundamentally different from that of present invention and, if operative, is of questionable practicability. It is evident from the Roberts disclosure that his device is supposed to detect gases by the effect of their molecular weights on emission from a hot, clean platinum surface in air. Unfortunately, this idea does not lead to a workable device.

Although the precise theory of operation of the present invention is not completely understood, the action is apparently explainable by reference to a phenomenon which has been known for many years. Langmuir and Kingdon,[1,2,3 and 4] showed that when an atom strikes a hot e. g. 1200° K. and above) surface whose electron work function φ is greater than the ionization potential V of the atom, an electron is taken from the atom which then evaporates as a positive ion. Thus, Kingdon[3], using a monatomic layer of oxygen on tungsten (φ=9.2 volts) as the hot surface was able to produce positive ions of calcium (V=6.1 volts), bismuth (V=8.0 volts) and copper (V=7.7 volts). To my knowledge, this phenomenon has never been utilized for the purposes of the present invention.

Referring now to Fig. 1, there will first be described one use of the invention as a "direct acting" vapor detector of substances which have an ionization potential (v) lower than the work function (φ) of the hot surface or of substances which give the desired indication in the presence of a sensitizing material having such an ionization potential. The mixture of air and the substance to be detected is sucked into the device through the flexible tube 1 by the small centrifugal blower 2 having an impeller 3 and a driving motor 4. A flow rate of about 20 cc. per second as set by the control valve 5 has been found to be satisfactory for the particular structure being discussed. A tube 6 of glass or other suitable material forming a portion of the envelope 7 causes the mixture to flow between electrodes which may comprise the outer platinum cylinder 8 (e. g. 0.285 inch inside diameter by 1 and 1/16 inches long) and the inner platinum cylinder 9 (.225 inch outside diameter by 1 and 1/16 inches long) and then out of the device at outlet 10. The inner platinum cylinder 9 may be heated to about 1200° K. by the double helical filament 11 which may be wound on the alumina cylinder 12 which may act as a sensitizing element when such is needed. If the device is to be employed to detect only substances such as the alkali metals which do not need sensitizing materials for proper action, the cylinder 12 may be omitted. The heater filament may be connected to any suitable power supply such as transformer 13 (e. g. approximately 6 volts and 8.5 amp.). The inner platinum cylinder 9 and one side of the heater filament may be connected together as shown in Fig. 1 and to the positive end of the high voltage power supply 14 (e. g. 100 to 800 volts) through a protective resistance 15. The negative end of the power supply may be connected, through a direct current micro-ammeter 16 (e. g. 30 microamp. full scale), which may be used as an indicator of the detected substance, to the outer platinum cylinder 8. A suitable shunt (not shown) is, of course, desirable to vary the meter scale reading for high vapor pressure gases. The supply 14 may be energized by any suitable means such as the variable auto transformer 17.

It will be understood that cylinders 8 and 9 and the alumina cylinder 12 may be mounted within envelope 7 by any suitable means such as the respective metallic leads 18, 19, 20 and 21, all embedded in the stem press 22.

When the foregoing device is first set up and run with air flowing through the device, large positive ion currents will be observed on the meter 16 (1000 microamperes or more). This large

[1] Langmuir and Kingdom, Science, vol. 57, page 58 (1923).
[2] Langmuir and Kingdom, Phy. Rev., vol. 21, page 380 (1923).
[3] Kingdom, Phy. Rev., vol. 23, pages 774 and 778 (1924).
[4] Langmuir and Kingdom, Pros. Roy. Soc. A, vol. 107, page 61 (1925).

"no-vapor" (current in the absence of any substance or vapor to be detected in the air flowing through) is due to the presence of impurities, mainly sodium and potassium in the alumina and platinum. After running at about 1200° K. for about 24 hours or more depending on the purity of the materials, the no-vapor positive ion current will drop to a few micro-amperes or less, indicating that the impurities have been practically exhausted. The device is then ready for use as a "direct acting" detector of compounds which have an ionization potential (V) lower than the work function (φ) of the hot inner platinum cylinder. The work function (φ) of platinum in air is probably around 6 volts. Hence if any of the alkali-metal vapors or their compounds are sucked into the device, a large increase in the positive ion current will be observed since they all have ionization potentials below 6 volts. For example, cigarette, wood, paper smoke and that from many other common materials will give large positive ion current indications on the meter. These materials usually contain sodium or potassium which are easily ionized by the surface of the hot platinum inner cylinder. On the other hand, heavy black smoke from a candle flame gives practially no indication. Here the ionization potential of carbon is 11.2 which is too high to be ionized by hot platinum in air.

The volt-ampere characteristics for the flow of positive ions between concentric cylinders in gases at atmospheric pressure may be calculated from the equations given in my article "Volt-ampere characteristics for the flow of ions or electrons between concentric cylinders in gases at atmospheric pressure" (Psy. Rev., vol. 70, page 228, 1946). These equations show that one can obtain practically saturation positive ion currents with a device of the dimensions described above if a high voltage supply of about 600 volts be used for currents up to about 30 microamperes. To obtain maximum sensitivity, it is, of course, desirable to operate the device well saturated, that is with the voltage sufficiently high that changes in voltage effect no change in the current. Current changes are therefore effected only by changes in the number of positive ions formed. As ion formation increases, the current in the device tends to become less and less saturated and therefore, the device tends to become less and less sensitive to the substances being detected for which reason the voltage is preferably kept well above the saturation value for all normally expected values of ion formation. Since for this mode of operation, the device acts as a rectifier, one may use an alternating instead of a unidirectional high voltage power supply if desired. This feature is a great convenience in many practical applications.

If the device is to be used only as a detector of compounds which have an ionization potential lower than the work function of the inner cylinder, the alumina cylinder 12 is, as already indicated, unnecessary. However, if the device is to be also used as a sensitive detector of substances such as the halogens and their compounds, it is necessary to provide a source of sensitizing material in the presence of which, the substance causes ion formation. Such a source may comprise any element containing one of the alkali metals or their compounds in sufficient amount to give the desired positive ion action in the presence of the substance to be detected, and for this purpose, the alumina cylinder will be found to suffice apparently because of alkali metal impurities therein. Thus, it has been found that the device of Fig. 1 constitutes a very sensitive "direct acting" halogen detector if it is used before the positive ion current producing impurities are exhausted. The mode of operation appears to be as follows: After a few hours running a sensitizing surface film of sodium (assuming sodium to be the principal positive ion forming impurity) develops on the platinum cylinder. If now a small amount of a halogen compound such as bromobenzene ($C_6H_5Br$) is mixed with the incoming air a large increase in the positive ion current is observed. As an example, with a "no vapor" (i. e. pure air) current of 3 micro-amperes, a vapor pressure of 5 bars of bromobenzene in air gave a "vapor" positive ion current of 23 micro-amperes or a current increase of 20 micro-amperes. Tests indicate that the current change when working well saturated is proportional to the square root of the vapor pressure of the halogen. The halogen probably cleans the surface of sodium which raises its work function ($\phi$) and also makes available more sodium atoms to be ionized by the hot surface. If the halogen is cut off, the surface layer builds up to its original condition by diffusion from the sodium in the alumina and the current returns to practically its original value of 3 micro-amperes. The life of a device as a halogen detector of this kind, is of course, dependent on the amount of active material stored in the alumina. For example, if one removes the alumina and thus has available only the normal amount of sodium and potassium which are present in all new platinum wire and foils, it will be found that the device has a relatively short life. Conversely, one may increase the normal life or restore the life by soaking the alumina in a water solution of one of the alkali metal salts. For example, the iodides of lithium, sodium, potassium, rubidium and caesium ($SiI$, $NaI$, $KI$, $RbI$ and $CsI$) are effective, also sodium and potassium silicates ($Na_2SiO_3$ and $K_2SiO_3$). For longer life, the alumina cylinder may be replaced by one of the alkali metal glasses which have been found so useful as positive ion emitters (see Blewett and Jones, Phy. Rev., vol. 50, page 464, 1936). For example, synthetic Leucite ($1K_2O: 1Al_2O_3: 4SiO_2$) seems to give excellent sensitivity and very long constant life, i. e. several thousand micro-ampere hours.

In Fig. 2, there is illustrated one embodiment of what may be called the "indirect action" halogen vapor detector. The mixture containing the substance to be detected enters the glass envelope 23 through the open glass stem 24 and passes over the outer platinum or Nichrome filament 25 and the inner platinum or Nichrome filament 26 which is wound on a suitable ceramic or alkalimetal glass cylinder 27 and thence out of the glass tube at outlet 28. The ceramic cylinder support 29 and filament leads 30, 31, 32 and 33 are clamped about an insulating tube 33a of glass or like material by the mica insulation 34 and metal clamp 35. A cork stopper 36 acts to close and support the envelope 23. The outer and inner filaments 25 and 26 are connected to separate insulated filament heating transformers 37 and 38, respectively. Filament control rheostats are indicated at 39 and 40. The outer filament 25 is connected to the positive end of the unidirectional high voltage supply 41 through the protective resistance 42 and the inner filament 26 is connected through a unidirectional micro-ampere meter 43 to the negative end of the power supply.

For the "indirect mode" of operation, the outer filament is heated to a good ionizing temperature (e. g. 1200° K. or above) such that every alkali metal atom or molecule which strikes its surface will evaporate as a positive ion. The inner filament is then heated up until the micro-ammeter shows a steady positive ion current of a few micro-amperes. Usually a new tube has to be run for about an hour to become steady and develop an active surface. If a ceramic cylinder is used for the inner filament support it is, of course, best to have it impregnated with one of the alkali metal compounds already discussed. If the cylinder is made of an alkali metal glass it already contains the necessary alkali metal. Here, the method of action appears to be as follows: The halogen reacts chemically with the surface of the alkali-metal glass and inner filament coating to release molecules of the potassium compound (assuming we have used a potassium glass cylinder). These molecules of the potassium compound are carried by convection and diffusion to the hot outer ionizing filament where they condense and re-evaporate as singly charged positive potassium ions which are then attracted back to the inner filament as a collector and thereby produce an increase in the positive ion current indicated on the micro-ammeter.

An advantage of this "indirect mode" of operation is that it permits separate independent control of the two operating functions. The temperature of the outer ionizing filament may be set so that every alkali metal compound molecule that strikes it will evaporate as a positive ion and similarly the temperature of the inner filament may be set to give the best surface condition for high chemical activity for sensitization or it may be used to control and hold constant the "no-vapor" current. Thus, by providing separate controls in this manner one can select the optimum operating temperature for ionization at the positive electrode and optimum operating temperature for the chemical action of sensitization initiated at the negative electrode. This affords wider design latitude. One can more readily avoid the danger of flooding the device with positive ions by operating the sensitization electrode at too high a temperature and yet raise its temperature to increase the sensitizing effect when desired as when the supply of sensitizing material tends to become somewhat depleted through use. It will be understood, of course, that the inner negative filament is directly attached to glass cylinder 27 only as a matter of preferred convenience in this particular case and that the negative collecting electrode could readily be placed apart from cylinder 27. Another advantage of this structure in which the positive ion emitter is the outer structure and the inner is the collector is that saturation currents are obtained at lower voltages for the same size devices.

The structure of Fig. 2 may, of course, be operated as a "direct action" vapor detector, in which case the inner filament and glass are made positive acting simultaneously as ionizer and sensitized chemically active surface. The outer filament then is made negative and becomes the collector of the positive ion emission. The outer filament may then be operated hot or cold as desired.

For detecting vapors in an open space, such as a room, the glass envelope 23 may be removed exposing the surfaces directly to the mixture of the air and the substance to be detected. In this case, a blower may be dispensed with and free convection may be allowed to perform its function. For detecting leaks in a vacuum system the device may be a part of or mounted inside the system to be tested and the leak searched out by going over the outside of the system with a halogen compound such as carbon tetrachloride (CCl$_4$) on a swab. It has also been found that the apparatus is extremely useful in the detection of leaks in the wall of a closed container of a volatile substance such as refrigerator conduits or condensers containing volatile refrigerants, e. g. those of the group of halogenated methanes generally known as Freon. If the apparatus be used as a detector of such leaks, the tube 1 in Fig. 1 may be used as an exploring nozzle which may be passed over the surface of the aforementioned container until the apparatus indicates the presence of the vapor of the substance within. It will then be known that a leak in the container exists at a point adjacent the position of the nozzle.

The following is a partial list of some of the halogen compounds to which the device is sensitive: chloroform (CHCl$_3$), ferric chloride (FeCl$_3$), hydrochloric acid (HCl), bromobenzene (C$_6$H$_5$Br), xylene hexafluoride (C$_8$H$_4$F$_6$), bromine (Br$_2$), sodium hypochlorite (NaClO), methyl iodide (CH$_3$I), monochlorobenzene (C$_6$H$_5$Cl), carbon tetra chloride (CCl$_4$), tetra chlorobenzene (C$_6$H$_2$Cl$_4$), paradibromobenzene (C$_6$H$_4$Br$_2$) methylene chloride (CH$_2$Cl$_2$), paradichlorobenzene (C$_6$H$_4$Cl$_2$), butyl bromide (CH$_3$(CH$_2$)$_2$CH$_2$Br), methyl chloride (CH$_3$Cl), "Freon #12," chlorodifluoro methane (CHClF$_2$), trichloroethylene (CHClCCl$_2$)

An over exposure to strong vapor usually will cause a slow return of the current to its normal "no vapor" value. Also, it may foul up the device by deposits resulting from the chemical action. In the latter case the device will require cleaning to restore its original sensitivity.

Useful sensitivities of about one part vapor to one million parts of air by volume have been obtained on several tests. The sensitivity of the device may, under certain conditions, be further improved if the method of operation comprise intermittently or periodically opening and closing the collector voltage supply circuit as by periodically opening and closing switch 44 and noting on a suitable ballistic detecting instrument in the place of meter 43, the current impulses or surges which occur upon closure of the circuit. It will be found that, with or without the presence of detectable vapor, such impulses or surges have a momentary magnitude considerably greater than the steady state current flow which occurs when the circuit remains closed. Apparently these momentary surges are due to storage of matter capable of actuating a ballistic detector, which matter is accumulated during the intervals when the circuit is open. Switch 44 may be opened and closed by any suitable means, such as solenoid 45 periodically actuated by a source 46 of periodic voltage pulses. The pulse length and pulse rate should be adjusted to give the best ballistic ratio between the "vapor" and "no vapor" values of current; for example, one second closed and thirty seconds open circuit has been found to give good results.

While I have shown and described particular embodiments of my invention, it will be obvious to those skilled in the art that various changes and modifications may be made without departing from the invention in its broader aspects and I, therefore, aim in the appended claims to cover all such changes and modifications as fall within the true spirit and scope of the invention.

What I claim as new and desire to secure by Letters Patent of the United States, is:

1. The method of detecting in an atmosphere the presence of a finely divided substance capable of inducing the formation of positive ions in the presence of a heated conductive surface which comprises bringing a quantity of said atmosphere containing the substance into contact with such a surface and detecting the presence of said substance by the detection of the presence of positive ions formed at said surface.

2. The method as in claim 1 in which said surface is heated to a temperature sufficient so that ion formation at said surfaces is substantially independent of small temperature variations from the aforesaid temperature.

3. The method as in claim 1 in which said substance has an ionization potential less than the electron work function of said surface.

4. The method as in claim 1 in which the step of detecting is performed intermittently.

5. The method of detecting in an atmosphere the presence of a finely divided substance of the class consisting of the alkali metals and compounds thereof capable of inducing the formation of positive ions in the presence of a heated conductive surface which comprises bringing a quantity of said atmosphere containing the substance into contact with such a surface and detecting the presence of said substance by the detection of the presence of ions formed at said surface.

6. The method as in claim 5 in which said surface is heated to a temperature sufficient to effect copious ion formation thereat.

7. The method as in claim 5 in which the step of detecting is performed intermittently.

8. The method of detecting in an atmosphere the presence of a finely divided substance capable of inducing the formation of positive ions in the presence of a heated conductive surface which comprises bringing a quantity of said atmosphere containing the substance into contact with the more positive electrode of a pair of electrodes, said positive electrode being heated between which an electrical potential is maintained and detecting the presence of said substance by measurement of the changes of current flow from said electrode resulting from said contact.

9. The method as in claim 8 in which said positive electrode is heated to a temperature sufficiently high to render said ion formation relatively insensitive to small temperature changes.

10. The method as in claim 8 in which said substance has an ionization potential less than the electron work function of the more positive of said electrodes.

11. The method as in claim 8 in which said electrical potential is applied intermittently.

12. The method of detecting in an atmosphere the presence of a finely divided substance of the class consisting of the alkali metals and compounds thereof which comprises bringing a quantity of said atmosphere containing the substance into contact with the more positive electrode of a pair of electrodes between which an electrical potential is maintained said positive electrode being heated and having an electron work function greater than the work function of said finely divided substance and detecting the presence of said substance by measurement of the changes of current flow from said electrode resulting from said contact.

13. The method as in claim 12 in which said positive electrode is heated to a temperature sufficiently high to render said ion formation relatively insensitive to small temperature changes.

14. The method as in claim 12 in which said electrical potential is applied intermittently.

15. The method of detecting in an atmosphere the presence of a finely divided substance capable of facilitating the formation of positive ions in the presence of a heated conductive surface sensitized by a sensitizing material capable of inducing ion formation in the presence of said surface which method comprises, sensitizing such a surface with such a sensitizing material, bringing a quantity of said atmosphere containing the substance into contact with said surface and detecting the presence of said substance by the measurement of the positive ions at said surface.

16. The method as in claim 15 in which said surface is heated to a temperature sufficient so that ion formation at said surface is substantially independent of small temperature variations.

17. The method as in claim 15 in which said material has an ionization potential less than the electron work function of said surface.

18. The method as in claim 15 in which the step of detecting is performed intermittently.

19. The method of detecting in an atmosphere the presence of a finely divided substance of the class consisting of the halogen elements and compounds thereof which method comprises sensitizing a hot surface with a sensitizing material of the class consisting of the alkali metals and compounds thereof; bringing a quantity of said atmosphere containing the substance into contact with said surface and detecting the presence of said substance by the measurement of positive ions formed at said surface.

20. The method as in claim 19 in which said surface is heated to a temperature sufficiently high to render said ion formation relatively insensitive to small temperature changes.

21. The method as in claim 19 in which the step of detecting is performed intermittently.

22. The method of detecting in an atmosphere the presence of a finely divided substance capable of facilitating the formation of positive ions at a heated conductive surface in the presence of a sensitizing material capable of inducing ion formation which method comprises, sensitizing at least one of a pair of electrodes with such a sensitizing material, applying a potential between said electrodes, and heating the more positive of said pair of electrodes, bringing a quantity of said atmosphere containing the substance into contact with said electrodes and detecting the presence of said substance by the detection of the change in flow of positive ions between said electrodes.

23. The method as in claim 22 in which one of said electrodes is heated to a temperature sufficient so that ion formation at said surface is substantially independent of small temperature variations.

24. The method as in claim 22 in which said material has an ionization potential less than the electron work function of the electrode at which said ions are formed.

25. The method as in claim 22 in which the step of detecting is performed intermittently.

26. The method of detecting in an atmosphere the presence of a finely divided substance of the class consisting of the halogen elements and compounds thereof which method comprises sensitizing at least one of a pair of electrodes with a sensitizing material of the class consisting of the alkali metals and compounds thereof, heating at least one of said electrodes, bringing a quantity of said atmosphere containing the substance into contact with said electrodes and detecting the presence of said substance by the measurement of the flow of positive ions between said electrodes.

27. The method as in claim 26 in which one of said electrodes is heated to a temperature sufficiently high to render said ion formation relatively insensitive to small temperature changes.

28. The method as in claim 26 in which the step of detecting is performed intermittently.

29. A detector for a finely divided atmospheric substance capable of inducing the formation of positive ions at a conductive surface comprising an electrical discharge device including a pair of electrodes, means for causing a quantity of an atmosphere containing said substance to pass between said electrodes, means for imposing an electric potential difference between said electrodes, and means for detecting changes in the current between said electrodes caused by the formation of positive ions at one of said electrodes due to the presence of said substance.

30. A detector as in claim 29 including means for heating one of said electrodes during said passage to a temperature sufficient to cause copious formation of said ions.

31. A detector as in claim 29 in which one of said electrodes has a conductive surface of a material having an electron work function greater than the ionization potential of said substance.

32. A detector as in claim 29 including means for heating one of said electrodes to a a temperature sufficient to cause copious formation of said ions and in which said means for imposing an electrical potential difference imposes a positive potential upon the heated electrode with respect to the other of said electrodes.

33. A detector as in claim 29 in which said means for imposing an electrical potential difference between said electrodes includes means for intermittently imposing the same.

34. A detector for a finely divided atmospheric substance of the class comprising the alkali metals and compounds thereof comprising an electrical discharge device including a pair of electrodes, means for causing a quantity of an atmosphere containing said substance to pass between said electrodes, means for imposing an electric potential difference between said electrodes, and means for detecting changes in the current between said electrodes caused by the presence of said substance.

35. A detector as in claim 34 including means for heating one of said electrodes during said passage to a temperature sufficient to cause copious formation of ions.

36. A detector as in claim 34 including means for heating one of said electrodes to a temperature sufficient to cause copious formation of ions and in which said means for imposing an electrical potential difference imposes a positive potential upon the heated electrode with respect to the other of said electrodes.

37. A detector as in claim 34 in which said means for imposing an electrical potential difference between said electrodes includes means for intermittently imposing the same.

38. A detector for a finely divided atmospheric substance capable of facilitating the formation of ions in the presence of a sensitizing material capable of inducing ion formation at a conductive surface comprising an electrical discharge device including a pair of electrodes, means for sensitizing at least one of said electrodes with such a sensitizing material, means for causing a quantity of an atmosphere containing said substance to pass between said electrodes, means for imposing an electrical potential difference between said electrodes, and means for detecting changes in the current between said electrodes caused by the formation of ions at one of said electrodes due to the presence of said substance.

39. A detector as in claim 38 including means for heating one of said electrodes during said passage to a temperature sufficient to cause copious formation of said ions.

40. A detector as in claim 38 in which one of said electrodes has a conductive surface of a material having an electron work function greater than the ionization potential of said material.

41. A detector as in claim 38 including means for heating one of said electrodes to a temperature sufficient to cause copious formation of said ions and in which said means for imposing an electrical potential difference imposes a positive potential upon the heated electrode with respect to the other of said electrodes.

42. A detector as in claim 38 including means for heating the more positive of said electrodes to a temperature sufficient to cause copious formation of ions thereat, means for coating the more negative of said electrodes with said sensitizing material and means for controllably heating the latter electrode to control the sensitization thereof.

43. A detector as in claim 38 including means for heating the more positive of said electrodes to a temperature sufficient to cause copious formation of ions thereat and wherein said first mentioned means comprises a source of sensitizing material adjacent the latter electrode for providing a coating of sensitizing material thereon.

44. A detector as in claim 38 in which said means for imposing an electrical potential difference between said electrodes includes means for intermittently imposing the same.

45. A detector for a finely divided atmospheric substance of the class comprising the halogen elements and compounds thereof comprising an electrical discharge device including a pair of electrodes, means for sensitizing at least one of said electrodes with a sensitizing material of the class comprising the alkali metals and compounds thereof, means for causing a quantity of an atmosphere containing said substance to pass between said electrodes, means for imposing an electrical potential difference between said electrodes, and means for detecting changes in the current caused by the presence of said substance.

46. A detector as in claim 45 including means for heating said one of said electrodes during said passage to a temperature sufficient to cause copious formation of said ions.

47. A detector as in claim 45 including means for heating one of said electrodes to a temperature sufficient to cause copious formation of ions and in which said means for imposing an electrical potential difference imposes a positive potential upon the heated electrode with respect to the other of said electrodes.

48. A detector as in claim 45 including means for heating the more positive of said electrodes to a temperature sufficient to cause copious formation of ions thereat, means for coating the more negative of said electrodes with said sensitizing material and means for controllably heating the latter electrode to control the sensitization thereof.

49. A detector as in claim 45 including means for heating the more positive of said electrodes to a temperature sufficient to cause copious formation of ions thereat and wherein said first mentioned means comprises a source of sensitizing material adjacent the latter electrode for providing a coating of sensitizing material thereon.

50. A detector as in claim 45 in which said means for imposing an electrical potential difference between said electrodes includes means for intermittently imposing the same.

51. The method of detecting in an atmosphere the presence of a finely divided substance capable of inducing the formation of positive ions in the presence of a heated conductive surface which comprises bringing a quantity of said atmosphere containing the substance into contact with such a surface and measuring the relative quantity of said substance by the measurement of substantially all of the positive ions formed at said surface by the presence of said finely divided substance.

52. The method of detecting in an atmosphere the presence of a finely divided substance of the class consisting of the alkaline metals and compounds thereof which comprises bringing a quantity of said atmosphere containing the substance into contact with a heated surface, said surface having a work function which is greater than the ionization potential of said finely divided substance, and measuring the relative quantity of said substance by measurement of the relative formation of positive ions formed at said surface by the presence of said substance.

53. The method of detecting in an atmosphere the presence of a finely divided substance capable of inducing the formation of positive ions in the presence of a heated conductive surface which comprises bringing a quantity of said atmosphere containing the substance into contact with such a surface and detecting the presence of said substance by attracting said positive ions formed at said surface to a negatively charged electrode and detecting said charge.

54. The method of detecting in an atmosphere the presence of a finely divided substance comprising bringing a quantity of said finely divided substance into contact with a sensitizer, passing said resultant atmosphere into contact with a pair of electrodes at least one of which is heated, said heated electrode having an electron work function greater than the ionization potential of said finely divided substance, applying a potential between said electrodes, said heated electrode having a more positive potential, and detecting the presence of said substance by the measurement of the flow of the positive ions between said electrodes.

CHESTER W. RICE.

REFERENCES CITED

The following references are of record in the file of this patent:

UNITED STATES PATENTS

| Number | Name | Date |
| --- | --- | --- |
| 1,421,720 | Roberts | July 4, 1922 |
| 1,809,115 | Goddard | June 9, 1931 |
| 1,914,883 | Cottrell | June 20, 1933 |
| 2,334,356 | Salzberg et al. | Nov. 16, 1943 |